MANUFACTURE OF LEVULINIC ACID AND ITS ESTERS
Filed Nov. 18, 1957
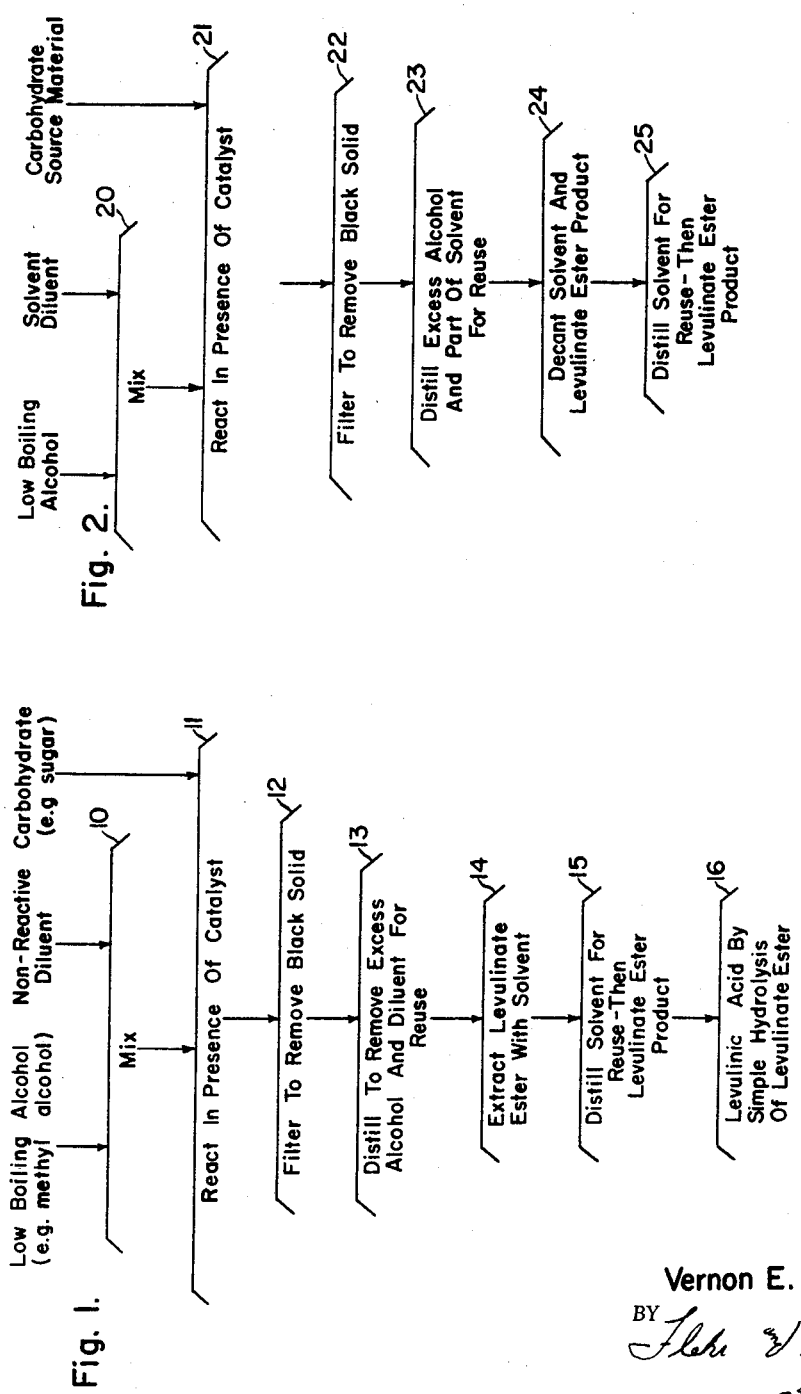
INVENTOR.
Vernon E. Haury

United States Patent Office 2,917,537
Patented Dec. 15, 1959

2,917,537

MANUFACTURE OF LEVULINIC ACID AND ITS ESTERS

Vernon E. Haury, Santa Susana, Calif., assignor of one-half to Simco Incorporated, San Francisco, Calif., a corporation of California Application November 18, 1957, Serial No. 697,250

16 Claims. (Cl. 260—483)

This invention relates generally to levulinic acid, and its derivatives, and methods for their preparation. More particularly, it pertains to a method for the preparation of alkyl esters of levulinic acid.

Although levulinic acid and levulinic acid esters have been known since the 1870's neither has achieved commercial use in any significant volume. The reasons for this slow development probably are, expensive raw materials, low yields, and excessive production costs. Also, certain detrimental physical properties of the acid, e.g. high boiling point, causing decomposition during distillation and a melting point at about 30–35° C., make product recovery and handling difficult.

It is generally accepted that levulinic acid and its derivatives would find a good market if production could be achieved easily and economically, and in sufficient quantities to permit large scale use in the chemicals manufacturing industry. A general object of the present invention, therefore, is to provide an improved method for the manufacture of levulinic acid and its esters.

A further object is to provide a method by which improved yields, simplified product recovery and more convenient handling can be attained, with reduction of costs.

Other objects and advantages of the present invention will appear from the following description and from the drawings in which:

Figure 1 is a flow sheet illustrating the general steps employed in carrying out my method, and Figure 2 is a flow sheet illustrating a modified or simplified version of the method.

Heretofore, the preparation of levulinic acid has depended upon the prolonged heating of various carbohydrates with mineral acids such as dilute hydrochloric acid, to cause decomposition of the carbohydrate producing the crude syrup of levulinic acid. Thereafter, it has been necessary to concentrate the crude product by evaporation to substantial dryness and to purify the levulinic acid by extraction and distillation. This procedure results in considerable loss of the levulinic acid by destruction of some of the acid as well as contamination of the levulinic acid by the products of such decomposition. If it is desired to prepare esters from the acid product, a further step involving the reaction of the acid with an alcohol is required. The levulinic acid also presents storage and transportation problems in that it is a solid melting at about 30–35° C., and is somewhat toxic.

In accordance with the present invention, alkyl esters of levulinic acid are prepared directly by heating sugar or other carbohydrates with low boiling alcohols such as methyl, ethyl or propyl alcohols. The improvement over the older processes is in the addition to such alcohols of a non-reactive diluent having a heat of vaporization less than that of water and preferably below that of the alcohol. Preferably, the diluent should constitute about 30 to 80% by volume of the diluted alcohol mixture with about 60% being deemed optimum. After removal of the insoluble solid products of the reaction, the unreacted alcohol may be removed from the reaction product by distillation. Water formed by the reaction will separate, if a sufficient amount of a water insoluble diluent is employed, and may be discarded. Thereafter the alkyl levulinate can be distilled with yields as high as 40 pounds and higher being obtained from each 100 pounds of carbohydrate treated. It will be understood that the preparation of the levulinate esters by this method requires considerably less heat than the prior processes because the heat of vaporization of the alcohol-diluent mixture is much less than that of water.

A non-reactive diluent as defined for use in the present invention is a chemical compound which, although it may be reactive in another sense, will not interfere with the production and recovery of the desired products, in this case, levulinic acid and levulinate esters and various intermediates in the production of these compounds (e.g. glycosides and alkoxymethylfurfurals). Preferred diluents are good solvents for the levulinate esters formed and are substantially insoluble in water, although these characteristics are not essential.

The main objection to the use of alcohols in the preparation of the levulinate esters have been the formation of large quantities of by-product ethers under conditions necessary to give good yields of the levulinate esters. Since the ethers derive from the reactant alcohols, large losses of alcohol result unless expensive recovery procedures are resorted to. A particular problem is presented when methyl ether is formed, as it is a gas at normal temperatures, and a special recovery system is required. The non-reactive diluents used in my process act to reduce the formation of these by-product ethers, and have unexpectedly been found to also improve the yield of the levulinate esters.

While it is possible to use various carbohydrate source materials, as will be presently explained, the use of sugar or dextrose in refined or unrefined form is preferred. Assuming the use of sugar, the method can be carried out substantially as illustrated in Figure 1. Step 10 represents the mixing of methyl alcohol or other low boiling alcohol with the non-reacting diluent. In step 11, the sugar and diluted alcohol are heated in the presence of a catalyst to produce the levulinate ester, after which the black solid or humus material, formed as a by-product, is removed by filtration as indicated in step 12. The reaction product can be subjected to distillation in step 13 to remove unreacted alcohol and diluent for reuse in subsequent processing. The reaction product can now be distilled to recover the methyl levulinate but better yields are obtained if the ester is first extracted at step 14 by a solvent such as aromatic hydrocarbons, chlorinated hydrocarbons, esters, ethers, alcohols, and ketones, etc., and the methyl levulinate recovered from the solvent by subsequent fractional distillation as at step 15. When desired, levulinic acid may be prepared from the ester by the additional step 16 of simple hydrolysis.

The reaction between the carbohydrate and diluted alcohol in step 11 can be carried out at a temperature between about 150 and 250° C., and preferably in a closed system. Generally, no more than about 10 to 15 minutes is required to complete the reaction. At the preferred temperature of about 215 to 225° C. the reaction is usually complete in about 5 minutes. These shorter reaction times are directly attributable to the higher reaction temperatures possible when using my improved process.

Strong acids catalyze the reaction to yield the levulinate esters. Acids having an ionization constant of about $1 \times 10^{-3}$ or stronger are preferred. Sulfuric acid, hydrochloric acid, p-toluenesulfonic acid, trichloroacetic acid, phosphoric acid and certain acidic ion-exchange resins are representative of the various acids which are useful as catalysts in this reaction.

As illustrated in Figure 2, the method of the invention may be simplified by the use of a diluent that is also a solvent for the levulinate ester and is substantially insoluble in water. In step 21 the reaction is again carried out as described in step 11 of Figure 1. Upon subsequent cooling of the reaction mass, the diluent apparently acts to extract the levulinate ester formed, with phase inversion, although the theory of extraction and separation is not quite clear. After filtration, step 22, the excess alcohol and part of the diluent may be distilled, step 23. It is desirable to decant the diluent containing the levulinate ester and discard the lower layer containing water and undesired products at step 24. The addition of more of the diluent to aid the separation may be desired. This is generally not required if the diluted alcohol used in the reaction contains about 50% or more of the diluent. Distillation of the upper layer yields the levulinate esters, step 25.

In both methods there is generally a small amount of ether in the reaction product. This may be dissolved in the alcohol-diluent mixture and used in subsequent preparations.

Preferred non-reactive diluents useful in carrying out the invention should have a heat of vaporization considerably below that of the lower alcohols and preferably below about 180 B.t.u. per pound at the boiling point. They should be non-reactive with the alcohols, virtually insoluble in water at room temperature and should exist as a liquid at temperatures below the reaction temperature. Preferably they should have a solubility at 20° C. less than about 5 parts per 100 parts of water. They should have boiling points between about 75 and 190° C. Desirably, they should also be solvents for the levulinic acid and esters, although as indicated in Figure 1, this is not necessary.

In Table I below, various non-reactive solvents, useful as diluents in the preparation of levulinic acid and its esters by the present method, are listed along with their heats of vaporization at the boiling points. For the purpose of comparison, the heats of vaporization of water and methyl and ethyl alcohols are also presented. It will be noted that the heat necessary to distill the alcohols is considerably less than that required for water. In turn, the heat required to distill the listed diluents is less than that required for the alcohols. This indicates that in addition to reducing ether formation, a substantial saving in heating costs will result when part of the alcohol is replaced by one of these diluents.

*Table I*

| Reagents: | Approx. heat of vaporization at boiling point, B.t.u./lb. |
|---|---|
| Water | 970 |
| Methyl alcohol | 472 |
| Ethyl alcohol | 367 |
| Diluents: | |
| Benzene | 169 |
| Toluene | 156 |
| Octanes | 117–126 |
| Cyclohexane | 154 |
| Chlorobenzene | 140 |

In addition to the diluents listed above, others such as ethers, esters, amides, and heterocyclic compounds such as pyridines, piperidines, furans, pyrans, dioxanes, etc. and mixtures of these diluents may be used. The low boiling aromatic hydrocarbons are generally preferred, particularly benzene and toluene.

Although methyl alcohol has a slightly higher heat of vaporization than ethyl alcohol, as indicated in Table I, the use of methyl alcohol is to be preferred because somewhat higher yields of the levulinate ester are obtained. It should be understood, however, that the invention is not limited to the reaction with a single alcohol, as a mixture of two or more alcohols may be advantageously employed.

A particular example making use of the general procedure outlined in Figure 2, is as follows: 160 pounds of methyl alcohol is diluted with 240 pounds of benzene and the resulting mixture reacted with 100 pounds of sugar in the presence of one pound of sulfuric acid by subjection to heating at 215° C. for 5 minutes. The reaction mixture is then filtered to remove 12 pounds of block solid and excess methyl alcohol and part of the benzene are distilled off along with a small amount of methyl formate produced by the reaction. The residue contains methyl levulinate, a small amount of levulinic acid and methoxymethylfurfural in an upper benzene layer and water and other products of the reaction in the lower layer. The lower layer, containing mostly water, may be separated and discarded. The benzene is distilled from the upper layer and then 40 pounds of methyl levulinate, distilling at about 196° C., is recovered.

The methoxymethylfurfural found as a by-product, may be heated with the alcohol-diluent mixture and acid catalyst for a nearly quantitative conversion to methyl levulinate or it may be added to subsequent praparations of methyl levulinate from carbohydrates.

In Table II, the effect of varying concentrations of the diluent is illustrated, with benzene as the diluent. The product yields of methyl levulinate set forth in the table represent the pounds of ester obtained by the reaction of 100 pounds of sugar in the manner just described with 55 gallons of the alcohol-diluent mixture, as also set forth in the table. It will be noted that the product yield increases as the diluent concentration is increased to about 70% benzene, with an optimum yield at about 60% benzene.

*Table II*

| Alcohol-Diluent Mixture, Volume Percent | | Methyl Levulinate Product, Pounds |
|---|---|---|
| Methyl Alcohol | Benzene | |
| 100 | --------- | 35 |
| 80 | 20 | 36 |
| 60 | 40 | 38 |
| 40 | 60 | 41 |
| 20 | 80 | 31 |

In Table III, it is shown that esters and ethers as well as benzene reduce the formation of ether in reactions in accordance with the invention. In each test 100 parts by weight of sugar was heated with the given amount of ethyl alcohol and diluent and one part of sulfuric acid catalyst to about 225° C. for 5 minutes. The levulinate ester yield in each case was about 30 parts.

*Table III*

| Ethyl Alcohol, Parts By Wt. | Diluent | Parts By Wt. of Diluent | Ether Produced, Parts By Wt. |
|---|---|---|---|
| 400 | None | ----- | 46. |
| 160 | Ethyl Acetate | 270 | Less than 5. |
| 160 | Benzene | 240 | Less than 5. |
| 295 | Ethyl ether | 95 | Less than 5. |

Further tests employing methyl alcohol diluted with toluene, cyclohexane, isooctane, chlorobenzene, and dimethyl formamide, were likewise effective in reducing ether formation. The levulinate ester yields, when the aromatic hydrocarbons were used, were higher than with the other diluents.

Reference has previously been made to the use of carbohydrate source materials other than sugar or dextrose. It should be understood that good results may be obtained using almost any carbohydrate source material, for example, corn, milo, wheat, rice, potatoes, sawdust, sugar beets, sugar cane and Jerusalem artichokes may be used. Typical yields of methyl levulinate by this process in pounds of methyl levulinate per 100 pounds of dry carbohydrate source material are: corn 19, milo 17, wheat 11, rice 22, sawdust 11, and dehydrated sugar beets 23. It is preferred that those materials having a high water content be dehydrated to contain about 10% or less water for use in the process. Also, when using a carbohydrate source material with a high protein content it is generally necessary to use a higher catalyst concentration than when using a nearly pure carbohydrate.

It is to be understood that the present invention is not to be limited to the batch process but may be carried out in a continuous or semi-continuous manner.

I claim:

1. In a process for producing esters of levulinic acid, reacting a carbohydrate with a mixture of a lower alkanol and a nonreacting diluent selected from the group consisting of hydrocarbons, chlorinated hydrocarbons, esters and ethers whose boiling points at atmospheric pressure do not exceed about 190° C., at a temperature on the order of 150° C. to 250° C., and in the presence of a strong acid catalyst, said nonreacting diluent being characterized by a heat of vaporization at the boiling point substantially less than that of the alkanol, extracting he levulinate ester formed by said reaction from the reaction mixture, and thereafter distilling the levulinate ester product.

2. The process of claim 1 wherein said nonreacting diluent has a heat of vaporization at its boiling point not greater than about 180° B.t.u. per pound.

3. The process of claim 2 wherein said nonreacting diluent constitutes between about 30% to 80% the volume of said diluted mixture.

4. The process of claim 1 wherein said nonreacting diluent is a solvent for the levulinate ester formed.

5. The process of claim 1 wherein said levulinate ester is extracted from the reaction mixture by said nonreacting diluent.

6. The process of claim 1 wherein said alkanol is methyl alcohol.

7. The process of claim 1 wherein said carbohydrate is sugar.

8. In a process for producing levulinic acid and its esters from carbohydrate source materials: reacting a carbohydrate with a mixture of a lower alkanol and a nonreacting diluent liquid selected from the group consisting of hydrocarbons, chlorinated hydrocarbons, esters and ethers whose boiling points at atmospheric pressure do not exceed about 190° C., at a temperature on the order of 150° C. to 250° C., and in the presence of a strong acid catalyst; said nonreacting diluent liquid being characterized by substantial insolubility in water at room temperatures and a heat of vaporization at the boiling point substantially less than that of the alkanol, said diluent liquid being a solvent for the levulinate ester formed by the reaction; removing solids and excess unreacted alkanol and diluent liquid from the reaction mixture; and distilling from said diluent liquid levulinate ester produced by the reaction.

9. The process of claim 8 wherein said diluent liquid constitutes between about 30% and 80% by volume of said mixture of alkanol and diluent liquid.

10. In a process for producing esters of levulinic acid, reacting a carbohydrate with a mixture of a lower alkanol and a diluent selected from the group consisting of hydrocarbons, chlorinated hydrocarbons, esters and ethers whose boiling points at atmospheric pressure do not exceed about 190° C., such diluent being characterized by nonreactivity with the carbohydrate and alkanol, said reaction occurring at a temperature on the order of 150° to 250° C., and in the presence of a strong acid catalyst, and distilling the levulinate ester formed from the reaction mixture.

11. The process of claim 10 wherein unreacted alkanol and diluent are removed from the reaction product, and the levulinate esters are extracted from the residue and distilled.

12. The process of claim 10 wherein the diluent is characterized by having a solubility in water at 20° C. less than about 5 parts per 100 parts of water, and by being a solvent for the levulinate ester product.

13. In a process for producing levulinic acid and its esters from sugar, reacting said sugar with a mixture comprising about 40% methanol and about 60% benzene, at a temperature on the order of 215° C., and in the presence of a small quantity of a strong acid catalyst, removing precipitated solids, water and unreacted methanol and benzene from the reaction mixture, and distilling methyl levulinate formed by the reaction from the reaction mixture.

14. The process of claim 13 wherein said strong acid catalyst has an ionization constant on the order of $1 \times 10^{-3}$ and stronger.

15. In a process for producing esters of levulinic acid, reacting a carbohydrate with a mixture of a lower alkanol and a diluent selected from the group consisting of hydrocarbons, chlorinated hydrocarbons, esters and ethers whose boiling points at atmospheric pressure do not exceed about 190° C., such diluent being characterized by nonreactivity with the carbohydrate and alkanol, said reaction occurring at a temperature on the order of 150 to 250° C., and in the presence of a strong acid catalyst, filtering said reaction mixture to remove insoluble solids, distilling unreacted alkanol and part of the diluent, allowing the reaction mixture to separate into a water layer and a product layer, separating the product layer from the water layer, and distilling from said product layer the levulinate ester formed.

16. In a process for producing esters of levulinic acid, reacting a carbohydrate with a mixture of a lower alkanol and a diluent selected from the group consisting of hydrocarbons, chlorinated hydrocarbons, esters and ethers whose boiling points at atmospheric pressure do not exceed about 190° C., wherein the diluent constitutes about 30 to 80% of the diluted alkanol mixture, at a temperature on the order of 150 to 250° C., and in the presence of a strong acid catalyst.

References Cited in the file of this patent

UNITED STATES PATENTS

| | | |
|---|---|---|
| 2,004,115 | Izard et al. | June 11, 1935 |
| 2,029,412 | Cox et al. | Feb. 4, 1936 |
| 2,738,367 | Redman | Mar. 13, 1956 |
| 2,763,665 | Lock et al. | Sept. 18, 1956 |